United States Patent [19]

Coffey

[11] Patent Number: 4,536,566

[45] Date of Patent: Aug. 20, 1985

[54] PROCESS FOR PREPARING SUBSTANTIALLY LINEAR POLYAMIDES FROM ACRYLAMIDE AND AQUEOUS AMMONIA

[75] Inventor: Gerald P. Coffey, Lyndhurst, Ohio

[73] Assignee: The Standard Oil Company, Cleveland, Ohio

[21] Appl. No.: 260,502

[22] Filed: May 4, 1981

[51] Int. Cl.$^3$ ............................................. C08G 69/00
[52] U.S. Cl. .................................... 528/363; 526/236; 526/303.1; 528/310; 528/323; 528/324; 528/332
[58] Field of Search .............. 528/363; 526/236, 303.1

[56] References Cited

U.S. PATENT DOCUMENTS

| | | | |
|---|---|---|---|
| 2,749,331 | 6/1956 | Breslow | 526/303 |
| 3,200,098 | 8/1965 | Goren | 526/236 |
| 3,242,152 | 3/1966 | Goren | 526/236 |
| 3,422,081 | 1/1969 | Wexler | 526/303 |
| 3,681,215 | 8/1972 | Peterson | 526/303.1 |
| 3,957,739 | 5/1976 | Cabestany et al. | 526/303.1 |
| 3,994,866 | 11/1976 | Lund et al. | 525/427 |
| 4,024,040 | 5/1977 | Phalangas et al. | 526/303.1 |

OTHER PUBLICATIONS

Billmeyer, *Textbook of Polymer Science*, (New York, John Wiley and Sons, 1962), p. 429.
Grant (Ed.), *Hackh's Chemical Dictionary*, (New York, McGraw-Hill Book Company, 1969), p. 533.
Synthetic Hetero Chain Polyamides, Korshak et al, 1964, p. 9.

*Primary Examiner*—Harold D. Anderson
*Attorney, Agent, or Firm*—David P. Yusko; John E. Miller, Jr.; Larry W. Evans

[57] ABSTRACT

Acrylamide and methacrylamide are either self-polymerized or copolymerized with other monomers, such as amino acids, in the presence of a stoichiometric amount of aqueous ammonia and at a temperature of at least 200° C. under autogenous pressure to form substantially linear polyamides, such as poly-$\beta$-alanine and nylon-3/6.

9 Claims, No Drawings

PROCESS FOR PREPARING SUBSTANTIALLY LINEAR POLYAMIDES FROM ACRYLAMIDE AND AQUEOUS AMMONIA

BACKGROUND OF THE INVENTION

1. Field of the Invention:

This invention relates to polyamides. In one aspect, the invention relates to substantially linear polyamides prepared from acrylamide or methacrylamide while in another aspect, the invention relates to a process for preparing these polyamides in the presence of aqueous ammonia.

2. Description of the Prior Art:

Matlack, U.S. Pat. No. 2,672,480, and Breslow, U.S. Pat. No. 2,749,331, teach the preparation of synthetic, substantially linear polyamides, such as poly-$\beta$-alanine, by contacting an amide containing at least one activated ethylene double bond and an active hydrogen atom, such as acrylamide, with a strongly basic catalyst, such as an alkali metal hydroxide, under substantially anhydrous conditions. Wexler, U.S. Pat. No. 3,422,081, extends this process to preparing highly crystalline, substantially linear, stereoregular polymers of methacrylamide by polymerizing the monomer in the presence of a catalyst system comprising a combination of an alkali metal alkoxide and a polyvalent metal salt.

Other methods for preparing polyamides are also known. Graf et al, U.S. Pat. No. 3,093,618, teach a method for the manufacture of polyamides derived from $\alpha$-aminocarboxylic acids where the monomer is polymerized at an elevated temperature and preferably in the presence of an accelerator, such as dimethyl formamide. Both Kobayashi et al, U.S. Pat. No. 3,499,879, and Volker et al, U.S. Pat. No. 3,629,203, teach an aqueous process for preparing a polyamide from acrylonitrile. Still other methods for preparing polyamides are known.

SUMMARY OF THE INVENTION

According to this invention, substantially linear polyamides are prepared by a process comprising contacting a first monomer of the formula

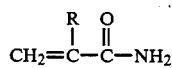
(I)

with a second monomer selected from the group consisting of:

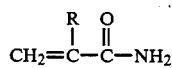
(I)

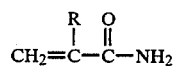
(II)

R"NH$_2$ (III)

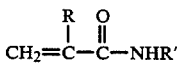
(IV)

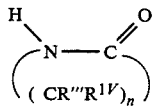
(V)

where
R is a hydrogen or methyl radical,
R' is a C$_1$-C$_{12}$ alkyl radical,
R" is a C$_1$-C$_{20}$ aliphalic, C$_4$-C$_8$ cycloaliphalic, or an aromatic radical,
R''' and R$^{IV}$ are independently a hydrogen or a C$_1$-C$_4$ alkyl radical,
m is an integer of 1-11, and
n is an integer of 2-11,
in a molar ratio of about 1:1 to about 9:1 in the presence of at least a stoichiometric amount, based on the combined moles of the monomers, of aqueous ammonia at a temperature of at least about 200° C. and autogenous pressure. This invention is particularly useful for preparing poly-$\beta$-alanine from acrylamide and does so without the need for either anhydrous solvents or strongly basic catalysts. Polyamide yields are good and relatively high molecular weights can be achieved.

DETAILED DESCRIPTION OF THE INVENTION

Monomers:

The monomers of formula I are but two, acrylamide and methacrylamide. Both these materials are well known in the art and need no further description here.

The monomers of formula II-V are N-alkylacrylamides, primary amines, amino acids and lactams, respectively. R' of formula II can be a primary, secondary or tertiary alkyl radical and typically contains between 1 and 12 carbons atoms, preferably between 1 and 8 carbon atoms.

R" in formula III is preferably a C$_1$-C$_{12}$ alkyl, C$_6$-C$_7$ cycloalkyl or a phenyl radical. Exemplary R" radicals include methyl, ethyl, n-propyl, isopropyl, n-butyl, sec-butyl, t-butyl, octyl, dodecyl, cyclopentyl, cyclohexyl, cyclooctyl, phenyl, biphenyl, naphthyl, and the like.

R''' and R$^{IV}$ in formulae IV and V are typically primary, lower (C$_1$-C$_4$) alkyl radicals or hydrogen. "Independently" here means that R''' and R$^{IV}$ can either be the same or different, e.g. both hydrogen or one hydrogen while the other an alkyl radical. Preferably, both are simultaneously hydrogen.

Amino acids where "m" is an integer of about 4-11 and lactams where "n" is an integer of about 4-11 are preferred to the other amino acids and lactams. Particularly preferred amino acids are 6-aminocaproic, 11-aminoundecanoic and 12-aminododecanoic acids and a particularly preferred lactam is $\epsilon$-caprolactam.

All the monomers of formulae I-V can bear inert substituents, i.e. substituents that are essentially nonreactive with the process reagents and products at process conditions. Typically the monomers are free of such substituents.

Polyamide Products:

The polyamides prepared from the monomers of this invention include both homo- and copolymers. Obviously, when the first monomer is acrylamide or methacrylamide and the second monomer is also acrylamide or methacrylamide, respectively, the homopolymer of poly-$\beta$-alanine or poly($\alpha$-methyl-$\beta$-alanine) is formed. However, when the first and second monomers are different, e.g. acrylamide and a primary amine, then the resulting polymer is a copolymer. Examples of the various polymers that can be made from this invention include poly-$\beta$-alanine (also known as poly-$\beta$-propionamide and nylon-3 and prepared from the homopolymerization of acrylamide), poly($\alpha$-methyl-$\beta$-alanine) derived from the homopolymerization of methacrylamide, and copolymers generally known as nylon-3/X and α-methyl nylon-3/X where the nylon-3 and α-methyl nylon-3 segments are derived from acrylamide and methylacrylamide, respectively, and the "X" segment of the polymer is derived from such materials as methacrylamide, N-t-butylacrylamide, N-t-octylacrylamide, methylamine, ethylamine, cyclohexylamine, aniline, 6-aminocaproic acid, ε-caprolactam, and the like.

The polyamides prepared by this invention are substantially linear homo- and copolymers which means that these polyamides, particularily those of relatively high molecular weight, can have some cross-linkages present However, the number of these cross-linkages is generally negligible.

The properties of these polyamides will obviously vary depending upon the monomers polymerized and the molecular weight of the polyamide. Reaction conditions can be varied to obtain different molecular weights of the same monomer and various monomers can be matched with one another to obtain desired physical characteristics, such as melt point. For example, nylon-3 is difficult to melt-spin into filament. However, by introducing an N-alkylacrylamide into the nylon-3 system as a comonomer, the resulting polyamide will have a lower melting point and processing temperature so that the resulting copolymer can be melt spun. Such a consideration is important in some commercial applications.

Aqueous Ammonia:

The hallmark of this invention is the use of aqueous ammonia to promote the polymerization of the various monomers. Historically, the strong base, e.g. sodium t-butoxide, catalyzed reaction had to be conducted under anhydrous conditions to avoid inactivating the catalyst. However, aqueous ammonia (a weak base), when used at the conditions later defined, readily promotes the formation of substantially linear polyamides without significant product degradation. The aqueous ammonia can be introduced in any suitable manner, but concentrated ammonium hydroxide is typically used for reasons of convenience. Although stoichiometric amounts are employed, the aqueous ammonia is actually catalytic in as much as it is not consumed during the reaction. This is another advantage of the invention in that the aqueous ammonia can be recycled or continuously used while requiring little, if any, make-up.

Process Conditions:

The relative amounts of first (formula I) and second (formulae II-V) monomer that can be used in the practice of this invention can vary widely. Typically, the first:second monomer mole ration is of about 1:1 to about 9:1, and preferably of about 3:1 to about 4:1. When the second monomer is a mixture of two or more compounds, e.g. a mixture of a monomer of formula II and a monomer of formula III, the number of moles of second monomer (as used in the above monomer mole ratios) is the total number of moles in the second monomer mixture. Usually the second monomer is a single compound and not a mixture. Obviously, there is not a first and second monomer mole ratio when both the first and second monomer are the same compound, i.e. both acrylamide or both methacrylamide.

At least a stoichiometric amount of aqueous ammonia, i.e. ammonium hydroxide, is necessary for the practice of this invention, but typically about a 10% molar excess is used. By stoichiometric amount is here meant that one mole of aqueous ammonia is required for each mole of reactants (first monomer plus second monomer). Although stoichiometric amounts are employed, the aqueous ammonia is a catalyst in as much as it is not consumed and is completely recovered at the completion of the process save for incidental amounts lost to the inefficiencies common to all processes. Use of an excess of aqueous ammonia helps ensure complete reaction of the monomers.

The temperature and pressure at which this process is conducted can vary over a wide range and will vary over the course of the reaction. The exact temperature employed at any given point in the reaction will depend upon such factors as the monomers being reacted, the presence or absence of a catalyst, the nature of the solvent (if any), the degree of polymerization desired, etc. However, at some point in the reaction the reactants are exposed to a set of confined conditions, i.e. typically a temperature of about 190° C. to about 250° C., preferably of about 200° C. to about 230° C., and autogenous pressure (that produced by the system itself). Operating this invention at temperatures lower than 190° C. generally favors reactions that produce products other polyamides while operating at temperatures higher than 250° C. generally does not result in any decided advantage.

The confined conditions described above need not be employed over the entire course of the reaction. Typically, it is advantageous to contact the reactants at temperatures and pressures lower than that described above for the first part of the reaction, gradually building to the confined conditions. During this preheat the ammonium hydroxide should be present to avoid or minimize any vinyl polymerization of the monomers. The reaction is then conducted at the confined conditions for a period of time (during which the ammonium hydroxide should also be present) and then the conditions gradually removed until the reaction is at a temperature and pressure at which the reaction products can be conveniently recoverd. The amount of time to complete the entire reaction will vary depending upon a whole host of factors including the kind of polymerization used, i.e. bulk or solution, size of the reaction mass, nature of the reactants, etc., but typically confined conditions are employed over the majority of the reaction time. At bench scale, the exposure time to the confined conditions can range from a few minutes to more than a day but is typically between 1 and 19 hours.

This reaction employs an aqueous medium and thus has no need for organic solvents. However, if the use of a solvent is desired, any solvent that has some degree of miscibility with water can be employed. Likewise, the use of an inhibitor for the suppression of free-radical polymerization is desirable and any of the well known inhibitors may be employed, such as N-phenyl-β-naphthylamine, p-methoxyphenol, hydroquinone, quinone, etc. The amount of inhibitor used will also vary, but generally is within the range from about 0.005 to about 1.0 wt. % based upon the total weight of the monomers.

The polyamides produced by this invention are recoverable from the reaction mass by conventional techniques. Usually this involves filtering and drying and subsequent processing of the product into a state suitable for its intended use. The uses for these polyamides are many and varied and will depend, at least to some degree, upon the ultimate molecular weight of the polymer. Another important consideration in the end-use of these polymers is the nature of the polymer, i.e. the physical properties associated with it derived at least in part from the monomers that were used to prepare it.

Where copolymers are prepared, particularly those from acrylamide and one monomer of formulae II–V, the polymer has a lower melting point and processing temperature than poly-β-alanine and this then reduces the use of expensive and troublesome solvent spinning or casting techniques required for processing the polymers. Polyβ-alanine undergoes degradation at a temperature of about 330°–340° C. and thus does not lend itself well to melt-spinning processing. Modified poly-β-alanine, i.e. the copolymer of acrylamide and some monomer of formulae II–V, has a melt point below 330°–340° C. and thus is more suitable for melt-spinning processing.

The following examples are illustrative of certain specific embodiments of this invention. Since glassware was used as the reaction vessel, a pressure release valve set at 40 psi was employed for safety considerations. All vacuums applied were about 2 mm of Hg or less and all melting ranges were determined on a Fisher-Johns melting point apparatus. The melting range was defined by the disappearance of crystallites, the upper limit of the range being the temperature at which the polymer had became totally transparent. Water solubility of all products was determined by use of a Soxhlet extractor over 16 hours. Unless otherwise noted, all parts and percentages are by weight.

Specific Embodiments

EXAMPLE 1

A 100 ml round-bottom flask was charged with p-methoxyphenol (0.142 g), acrylamide (14.266 g) and concentrated (29%) ammonium hydroxide (11.744 g). The flask contents were then swirled until a solution was formed. The flask was subsequently placed in a cage equiped with a tee arrangement consisting of an adjustable pressure relief valve and a ball valve to relieve the pressure to the atmosphere and through which a vacuum could be drawn. The cage assembly was placed in an oil bath at 200° C. and heated for 16 hours. At the end of this time, the pressure was released to the atmosphere and the heating continued for an additional hour. A vacuum was then applied for an additional 3 hours at 200° C.

The flask was broken to retrieve the product (14.656 g) which was then ground to a fine powder in a mortar and pestle. When exposed to a temperature of 315° C., the product turned brown but did not melt. The extent of water-insolubility was measured at 90%. The proton NMR and infrared spectra of the product were characteristic of poly-β-alanine. Less than 5% of polyacrylamide was detected.

A $^{13}$C NMR spectrum of the water-insoluble fraction showed an essentially linear poly-β-alanine backbone with minimal cross-linking. X-ray analysis revealed a crystallinity of about 39.6%. Elemental analysis showed %N was 18.5% (theoretical %N for poly-β-alanine is 19.7%).

Comparison

Example 1 was repeated except aqueous ammonia was replaced with water to yield a product containing between 60–80% poly-β-alanine and 20–40% polyacrylamide. Water insolubility in this case was 92% but these materials were highly cross-linked since they were insoluble in either trifluoroacetic acid or formic acid. X-ray analysis showed considerably lower crystallinity (3.5–10%) and elemental analysis showed %N dropped to 14.2%. These data demonstrate that aqueous ammonia is beneficial to the preparation of substantially linear poly-β-alanine.

EXAMPLE 2

A 100 ml round-bottom flask was charged with equal molar amounts of acrylamide (7.109 g), N-t-butylacrylamide (12.818 g), p-methoxyphenol (0.193 g) and water (16.943 g). The flask was equipped with a stainless steel tee assembly as used in Example 1. The entire assembly was put in a cage and then placed in an oil bath at 200° C. for 16 hours. The pressure was subsequently released to the atmosphere for 1 hour at 200° C. and a vacuum was applied for 3 hours at 200° C. The recovered crude product melted from 97°–108° C.

The polymer was determined to be 83% insoluble in water and the insoluble portion melted from 97°–116° C. with good stability to approximately 315° C. An integral, almost transparent film was molded from the water-insoluble fraction. IR spectroscopy indicated the presence of secondary and tertiary amide groups in the crude product, both in the water-soluble fraction and the water-insoluble fraction, with the amount of tertiary amide being greater in the water-insoluble fraction. Proton-NMR analysis indicated that the N-t-butylacrylamide was incorporated directly into the polymer backbone.

EXAMPLE 3

Example 2 was repeated except that a 80/20 acrylamide/N-t-butylacrylamide mole ratio was employed and the flask was thus charged with acrylamide (11.376 g), N-t-butylacrylamide (5.110 g), N-phenyl-β-naphthylamine (0.166 g) and aqueous ammonia (11.857 g). The recovered product had a melting range of 256°–261° C. and was 27% water-insoluble. The insoluble fraction had a melting range of 295°–300° C. and $^{13}$C-NMR analysis showed the insoluble fraction had a copolymer composition of 91/9 mole percent nylon-3/N-t-butylnylon-3.

EAMPLE 4

A thick-walled, 100 m round-bottom flask was charged with acrylamide (7.99 g), N-t-butylacrylamide (4.76 g), p-methoxyphenol (0.128 g) and ammonium hydroxide (9.67 g). The monomer molar charge was 75/25 acrylamide/N-t-butylacrylamide. The flask was tightly stoppered, placed in a cage and heated by total emersion for 16 hours in an oil bath in 150° C. The stopper was then replaced with a stainless steel tee similar to those used in the preceding examples. Heating was continued for an additional 2 hours at 200° C. and 40 psi back-pressure and then the pressure was subsequently released into the atmosphere for 1 hour at 200° C. A vacuum was then applied for 3 additional hours at 200° C. The resulting polymer had a melting range of 258°–265° C. and was 42% water-insoluble. The water-soluble portion had a melting point of 295°–297° C. and the copolymer composition as determined by proton-NMR analysis was determined to be 85/15 mole percent nylon-3/N-t-butyl nylon-3 for the crude product and 88/12 for the insoluble portion.

EXAMPLE 5

Under the same conditions with the same apparatus as used in Example 4, acrylamide (9.05 g), N-t-octylacrylamide (4.12 g), p-methoxyphenol (0.132 g) and ammonium hydroxide (9.67 g) were reacted. The molar monomer charge of acrylamide to N-t-octylacrylamide was 85/15. The resulting polymer had a melting range of 296°–319° C. and was 72% water-insoluble. The insoluble portion had a melting range of 321°–325° C. and the copolymer composition was determined by proton-NMR analysis to be 90/10 mole percent nylon-3/N-t-octyl nylon-3 for the crude product and 93/7 for the water-insoluble portion.

EXAMPLE 6

The procedure of Example 4 was again repeated except the reactants were acrylamide (10.65 g), 6-aminocaproic acid (6.56 g), p-methoxyphenol (0.107 g) and ammonium hydroxide (9.67 g). The monomer molar ratio was 3/1 acrylamide/6-aminocaproic acid. The heating sequence after the initial 16 hours at 150° C. was an additional 3 hours at 150° C. and 40 psi followed by 1 hour at 200° C. and 40 psi followed by an additional ½ hour at 200° C. at atmospheric pressure and finally 2½ hours at 200° C. under a vacuum. The resulting light yellow, opaque solid was determined to be approximately 22% water-insoluble and the melting range of the crude product was 262°–265° C. The insoluble portion melted at 279°–281° C. IR and proton-NMR spectra indicated incorporation of the nylon-6 structure (6-aminocaproic acid) into the polymer backbone. The composition of the crude product was 76/24 mole percent nylon-3/6 and the insoluble portion was 79/21 nylon-3/6.

EXAMPLE 7

The procedure of Example 4 was again repeated except that acrylamide (14.2 g), 40% aqueous methyl amine (4.26 g), p-methoxyphenol (0.142 g) and ammonium hydroxide (9.67 g) were charged to the flask. After the heating sequence, a yellow, opaque solid with a melting range of 275°–285° C. was recovered. Proton-NMR analysis showed that the amine monomer was incorporated directly into the polymer backbone. The polymer was 34.5% water-insoluble and the insoluble portion had a melting range greater than 315° C.

EXAMPLE 8

Example 7 was repeated except the charge was acrylamide (14.2 g), 40% aqueous methyl amine (1.71 g), p-methoxyphenol (0.142 g) and ammonium hydroxide (11.61 g). The recovered product was a yellow, opaque solid with a melting range in excess of 315° C. and again the proton-NMR analysis indicated that the amine monomer was incorporated directly into the polymer backbone. The polymer was 63.6% water-insoluble and the insoluble portion had a melting range of 320°–326° C.

EXAMPLE 9

Using the same equipment as in Example 7, acrylamide (14.2 g), 40 wt % aqueous methylamine (5.12 g), p-methoxyphenol (0.142 g) and ammonium hydroxide (9.03 g) were heated for 16 hours at 150°, followed by 3 hours at 150° C. and 40 psi, followed by 1 hour at 200° C. and 40 psi, subsequently ½ hour at 200° C. at atmospheric pressure and finally 2½ hours at 200° C. at a vacuum. The resulting polymer was a light yellow, opaque solid with a melting range of 255°–258° C. and was approximately 23% water-insoluble. The insoluble portion had a melting range of 306°–318° C. and the IR and proton-NMR analysis confirmed the presence of N-methyl nylon-3 in the polymer backbone.

EAMPLE 10

Example 9 was repeated except the charge consisted of acrylamide (14.2 g), n-propylamine (2.60 g), p-methoxyphenol (0.142 g) and ammonium hydroxide (10.32 g). The recovered light-yellow, opaque solid had a melting range of 289°–293° C., was 45% water-insoluble and the insoluble portion had a melting range of 302°–315° C. The IR and proton-NMR analysis indicated an 87/13 mole percent nylon-3/n-propylnylon-3 backbone for the crude product and a 92/8 backbone for the insoluble portion.

EXAMPLE 11

Example 7 was repeated except the charge consisted of acrylamide (10.65 g), aniline (4.60 g), p-methoxyphenol (0.107 g) and ammonium hydroxide (6.77 g). The heating sequence consisted of 16 hours at 150° C., 2 hours at 200° C. and 40 psi, 1 hour at 200° C. at atmospheric pressure and finally 3 hours at 200° C. under vacuum. The recovered product was a light yellowish-green opaque solid with a melting range of 268°–271° C. and was 69% water-insoluble. The insoluble portion had a melting range of 287°–293° C. IR and proton-NMR analysis indicated a composition of 84/16 mole percent N-phenyl nylon-3 for the crude product backbone and 87/13 for the water-insoluble portion.

EXAMPLE 12

Example 11 was repeated except cyclohexylamine (4.90g) was subsituted for the aniline. The product was an off-white, opaque solid with a melting range of 281°–284° C. and was 89% water-insoluble. The insoluble portion had a melting range of 297°–298° C. IR and proton-NMR analysis indicated an 87/13 mole percent N-nylon-3/N-cyclohexyl nylon-3 backbone for the crude product and an 88/12 backbone for the insoluble portion.

EXAMPLE 13

Using the same equipment and procedure as employed in the preceding Example, a charge of acrylamide (11.32 g), ε-caprolactam (4.538 g), N-phenyl-β-naphthylamine (0.159 g) and ammonium hydroxide (11.758 g) were charged to a thick-walled, 100 ml round-bottom flask. The heating sequence was 16 hours at 200° C. at 40 psi followed by 1 hour at 200° C. at atmospheric pressure followed by 3 hours at 200° C. under a vacuum. The resulting orange-tan, opaque solid had a melting range of 220°–250° C. and was 30.6% water-insoluble. The melting range of the insoluble portion was 260°–290° C. IR and proton-NMR analysis showed the presence of nylon-3/6 copolymer at a ratio of approximately 87/13 mole percent for the insoluble portion. The monomer mole ratio was 80/20 acrylamide/ε-caprolactam.

EXAMPLE 14

Example 13 was repeated except the monomer mole ratio was changed to 75/25 acrylamide/ ε-caprolactam. The heating sequence was 150° C. at 40 psi for 19 hours, followed by 200° C. at 40 psi for 1 hour, followed then by 200° C. at atmospheric pressure for ½ hour, and finally 200° C. under vacuum for 2½ hours. The crude product had a melting range of 253°–255° C., the resulting polymer was approximately 34% water-insoluble and the insoluble portion melted at 288°–291° C. The IR and proton-NMR analysis showed incorporation of the nylon-6 structure into the polymer backbone. The composition of the crude product was 78/22 mole percent nylon-3/6 and the insoluble portion was 84/16 nylon-3/6.

Although this invention has been described in considerable detail by the preceding examples, these examples are for the purpose of illustration only and many variations and modifications can be made by one skilled in the art without departing from the spirit and scope of the appended claims.

What is claimed is:

1. A process for preparing a substantially linear polyamide, the process comprising contacting a first monomer of the formula

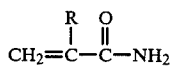 (I)

with a second monomer selected from the group consisting of:

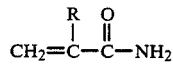 (I)

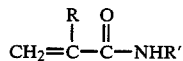 (II)

where
R is a hydrogen or methyl radical, and
R' is a $C_1$–$C_{12}$ alkyl radical, in a molar ratio of about 1:1 to about 9:1 in the presence of at least a stoichiometric amount, based on the combined moles of the monomers, of aqueous ammonia at a temperature of at least about 190° C. and autogenous pressure.

2. The process of claim 1 where both the first and second monomer are of formula I.

3. The process of claim 2 where R is hydrogen radical.

4. The process of claim 2 where R is methyl radical.

5. The process of claim 1 where the second monomer is of formula II.

6. The process of claim 5 where R' is a $C_1$–$C_8$ alkyl radical.

7. The process of claim 6 where the second monomer is selected from the group consisting of N-t-butylacrylamide and N-t-octylacrylamide.

8. The process of claim 3, 4, 5, 6 or 7 where the aqueous ammonia is present in a molar excess based on the total moles of the first and second monomers.

9. The process of claim 8 where the aqueous ammonia and first and second monomers are contacted first at a temperature below 190° C. and subsequently at a temperature between about 200° C. and about 230° C. and autogenous pressure.

* * * * *